Dec. 26, 1961     H. A. HECKENDORF     3,014,764
ANTI-SKID DEVICE
Filed Jan. 9, 1961
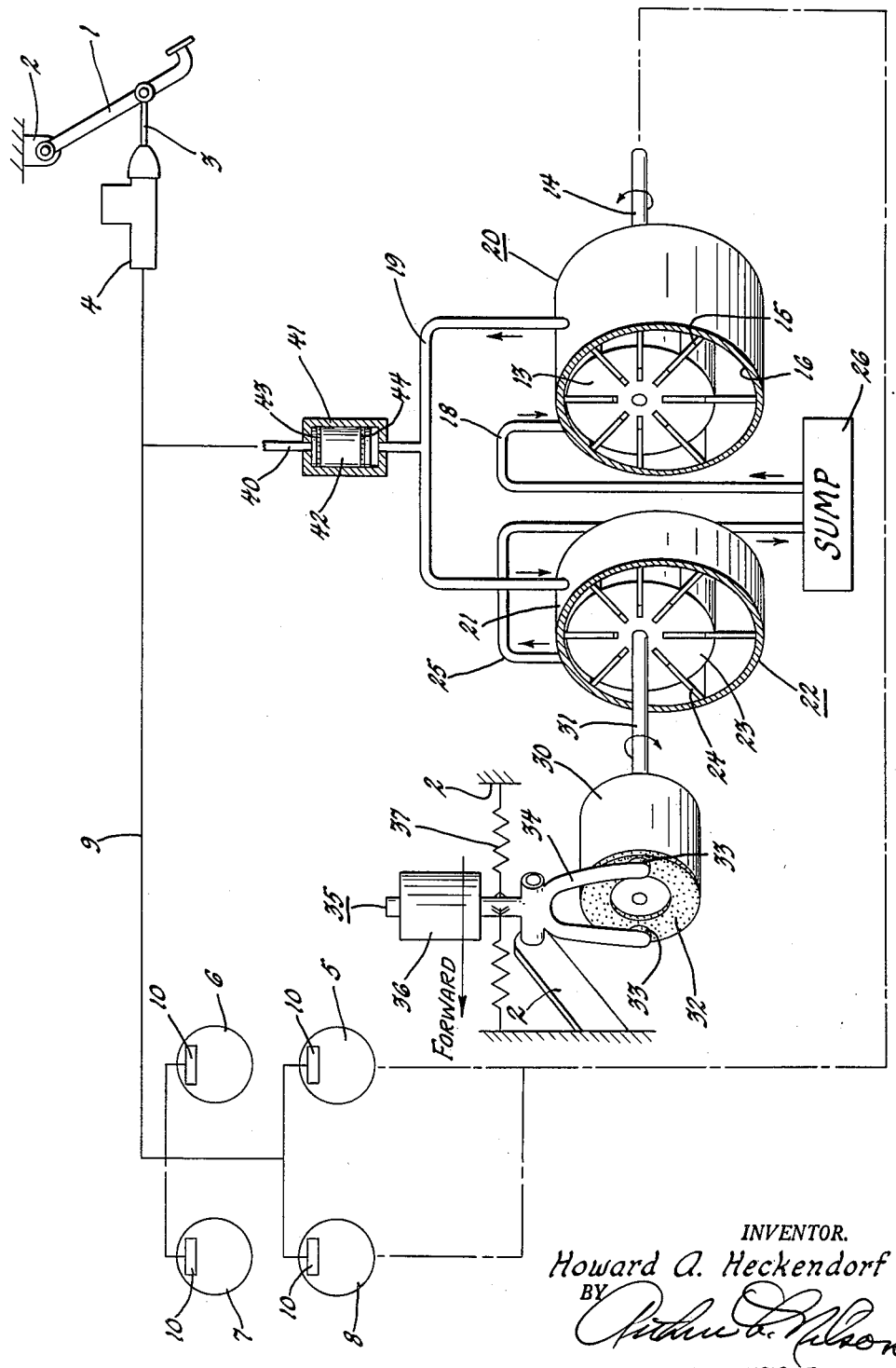
INVENTOR.
Howard A. Heckendorf
BY
HIS ATTORNEY

3,014,764
ANTI-SKID DEVICE

Howard A. Heckendorf, Milwaukee, Wis., assignor to General Motors Corporation, Detroit, Mich., a corporation of Delaware
Filed Jan. 9, 1961, Ser. No. 81,289
6 Claims. (Cl. 303—21)

This invention relates to a braking means for a motor vehicle and more particularly to an anti-skid device operating in combination with the braking means on a motor vehicle.

To obtain maximum braking on a motor vehicle, it is necessary that the vehicle wheels maintain a rotating condition relative to the road. When the vehicle wheels fail to rotate and are in a slipping condition on the road surface, the braking effect on the motor vehicle is substantially reduced. Accordingly, the optimum condition in braking of a motor vehicle is to maintain a rotating condition of the vehicle wheel wherein the wheel maintains a firm grip with the road surface. It is not always possible for the operator to control the braking to maintain this condition particularly under a panic stop during emergency conditions.

Accordingly, this invention is intended to provide a momentary reduction of hydraulic fluid pressures in the hydraulic fluid brake actuating system when a slipping condition exists on the vehicle wheels.

It is an object of this invention to provide a fluid pressure system operating in response to wheel rotation wherein the fluid pressure system provides a secondary pressure control for the hydraulic fluid brake actuating system to counteract slipping of the vehicle wheels during the braking cycle.

It is another object of this invention to provide a hydraulic fluid override system operating in response to wheel rotation to reduce the fluid line pressure in the hydraulic fluid brake actuating system to counteract slipping of the vehicle wheels.

It is a further object of this invention to provide an anti-skid device having a hydraulic fluid pump operated by a drive shaft controlling the fluid line pressure in a hydraulic fluid brake actuating system to prevent slippage of the wheels during the braking cycle.

The objects of this invention are accomplished by connecting an override fluid pressure system through a control means with a hydraulic fluid brake actuating system on a motor vehicle. The override fluid system includes a hydraulic fluid pump connected to the vehicle wheels. A hydraulic fluid motor is connected to a fly wheel. The hydraulic fluid pump and motor are in communication with each other in such a manner that the motor is driven when the pump is operated as both units are positive displacement units.

The fly wheel is decelerated through an inertia element operating a retarding means engaging the fly wheel in response to deceleration of the motor vehicle. A conduit means connecting the fluid motor and fluid pump is connected through a floating piston in the connecting passage to the hydraulic fluid system. The floating piston operates in response to pressure in the hydraulic fluid brake actuating system in opposition to a pressure in the override hydraulic fluid pumping system. As the vehicle brakes are actuated, the vehicle decelerates normally and the vehicle wheel continues the pumping in direct proportion to the speed of rotation of the vehicle wheel. The deceleration causes the retardation in rotation of the fly wheel. As the fluid motor encounters a resistance to the retardation of the fluid motor, the pressure is built up in the override system causing the floating piston to be biased in the direction of the hydraulic fluid brake actuating system.

With a stopping of the vehicle wheels which causes the skidding on the road surface, the fluid pump also stops and accordingly the decrease in pressure in the override fluid system causes a momentary decrease in pressure in the hydraulic fluid brake actuating system permitting the vehicle wheels to again rotate normally. With normal rotation of the vehicle wheels, the pressure is built up within the override fluid system and a normal braking condition is established.

Further objects and advantages of the present invention will be apparent from the following description, reference being had to the accompanying drawings wherein preferred embodiments of the present invention are clearly shown.

In the drawings:

The drawing illustrates the anti-skid device in communication with the hydraulic fluid brake actuating system.

Referring to the drawings, the brake pedal 1 is povotally mounted to the chassis 2 and pivotally connected to the push rod 3. The push rod 3 extends into the master cylinder 4 and operates the master piston for pressurizing fluid within the master cylinder.

The plurality of vehicle brakes 5, 6, 7, and 8 are in communication with the master cylinder 4 through the hydraulic fluid line 9. The hydraulic fluid brake actuating system is conventional in that it has a conventional master cylinder and wheel cylinder 10. Fluid is pressurized within the hydraulic brake actuating system by the master cylinder 4.

The vehicle rear wheel brakes 5 and 8 controls the rotation of the rear vehicle wheels. The rear vehicle wheels and the rotor 13 are driven by means of the drive shaft 14. The rotor 13 could be driven by any one or all vehicle wheels to provide the desired operation. The rotor 13 carries the plurality of radially extending vanes 15 which engage in a periphery of the housing 16. By rotation of the motor 13 fluid is pumped from the inlet passage means 18 through the pump to the outlet passage means 19. The fluid pump 20 could be any type of fluid pump providing a fluid pressure in the conduit 19.

The conduit 19 is in communication with the inlet port of the motor housing 21. The motor 22 includes a rotor 23 and a plurality of vanes 24 operating within the housing 21. The fluid pressure in the conduit 19 drives the rotor 23 and the fluid motor 22. The fluid is exhausted through the return passage 25 which is in communication with the reservoir 26. The fluid in the reservoir 26 is then circulated through the conduit 18 to the pump 20.

The rotor 23 is connected to the fly wheel 30 by means of the shaft 31. The fly wheel 30 has a friction material 32 bonded to the end of the fly wheel 30. The fly wheel 30 is retarded in its rotation during brake actuation by the brake shoes 33 which are connected to the shoes 34. The shoes 34 are integral with the lever 35 which is connected to the weight 36 on the opposite end from the shoes. The lever 35 is pivotally mounted on the chassis 2. The lever 35 pivots in response to the weight 36 as the vehicle is decelerated. The lever 35 returns to a neutral position due to the biasing force of the spring 37 when the vehicle is not decelerating.

The override hydraulic fluid system which includes the conduit 19 is in communication with the hydraulic fluid line 9 through the passage means 40. The passage means 40 includes a cylinder 41 which receives a floating piston 42. The floating piston 42 is provided with seals 43 and 44 maintaining a separation of fluid from the hydraulic fluid line 9 and the conduit 19 in the override system. The cylinder 41 and the piston 42 may be constructed in such a manner that a smaller area is exposed to the hydraulic fluid line in relation to the area exposed to the override hydraulic fluid system. It is the area on the opposing surfaces of the flowing piston 42 which controls the predetermined release pressure for the vehicle brakes.

The operation of the device will be described in the following paragraphs.

As the brake pedal 1 is depressed the pedal pivots on its axis pressurizing fluid in the master cylinder 4. The pressurization of the fluid in the master cylinder 4 in turn actuates the plurality of vehicle brakes through the wheel cylinders 10. The actuation of the vehicle brakes retards rotation of the vehicle wheels. The rear vehicle wheels associated with the vehicle brakes 5 and 8 cause a decelerating movement of the vehicle wheels and the motor vehicle. The relationship of the annular deceleration of the vehicle wheels and the motor vehicle is in a direct relationship. So long as the vehicle wheels continue to rotate normally and frictionally engage the road surface, the vehicle is decelerated normally. If the rear vehicle wheels begin a slipping condition on the road surface, the angular deceleration of the vehicle wheels are suddenly increased.

The anti-skid device includes an hydraulic override system operating in response to rotation of the vehicle wheel. When the motor vehicle is traveling and the vehicle wheels are rotating normally, the rotor 13 of pump 20 is also rotating. When the vehicle brakes are not applied, the rotation of the rotor 13 causes a pumping action circulating fluid through the conduit 19. This in turn creates a pressure on the radial vanes in the motor 22. The circulation of the pressurized fluid through the motor 22 causes a rotation of the rotor 23 and the fly wheel 30. Under these conditions, the pump and the motor are rotating the fly wheel 30. The override system, however, does not generate much pressure within the condut 19 as the fly wheel and the rotor 23 are rotating freely.

Upon application of the vehicle brakes, the vehicle wheels decelerate angularly causing deceleration of the motor vehicle. The deceleration of the motor vehicle causes the lever 35 to pivot about its pivot point due to the inertia of the weight 36. This in turn causes braking action by the brake shoes 34 on the lever 35. The braking action of the fly wheel causes a retardation of the angular velocity of the rotor 23. This in turn creates a build up of pressure within the conduit 19 as the vehicle wheel 12 is rotating and the rotor 23 in the pump 22 decelerates. The pressure is built up in the conduit 19 as the rotor 23 decelerates due to the braking force on the fly wheel 30. The increase in pressure in conduit 19 causes a biasing force on the piston 42. The piston 42 is biased against the fluid pressure in the passage 40 in communication with the hydraulic fluid lines of the brake actuating system. So long as the rear wheels rotate normally, the pressure is maintained in the conduit 19 and the brakes operate normally due to the pressurization in the master cylinder 4.

If, however, the rear wheels slip on its contact surface with the road, the wheel decelerates angularly. The vehicle wheel decelerates to the point where it is under a locked condition which in turn locks the rotor 13 of the pump 20. With the rotor being in a stationary condition, the fluid pressure in the conduit 19 likewise diminishes to zero. With the pressure in the hydraulic fluid brake actuating system remaining, the pressure forces the fluid within the chamber of the cylinder 41 in communication with the hydraulic fluid brake actuating system. The momentary release of pressure due to the shifting movement of the piston 42 permits the decrease in pressure in the plurality of wheel cylinders 10. With the reduction in pressure of the wheel cylinder 10, the brakes are momentarily released permitting normal rotation of the vehicle wheels again. With a normal rotation of the vehicle wheels the pressure again builds up in the conduit 19 restoring normal rotation to the rotor 23 of the motor 22. The braking cycle returns to normal causing deceleration of the vehicle and a pivoting movement of lever 35. This in turn biases piston 42 to restore normal pressure in line 9 and normal brake actuation.

The anti-skid device operates in response to the angular deceleration of the vehicle wheels and the linear deceleration of the motor vehicle causing a pivoting action on the lever 35. It can be seen that with a momentary decrease in pressure in the hydraulic fluid lines that normal rotation of the vehicle wheels are again restored. This corrective cycle requires a small increment of time but it does permit the wheels to regain normal rotation to permit the operator of the vehicle to maintain directional control of the motor vehicle.

It also causes maximum braking effectiveness during the braking cycle.

While the embodiments of the present invention as herein disclosed, constitute preferred forms, it is to be understood that other forms might be adopted.

What is claimed is as follows:

1. An anti-skid device comprising in combination, a hydraulic fluid brake actuating system, a hydraulic fluid override system in pressure communication with said hydraulic fluid brake actuating system, an anti-skid device comprising a vehicle wheel, a fluid pump driven by said vehicle wheel, a fluid motor, a fly wheel connected to said fluid motor, conduit means for circulating a hydraulic fluid in communication with said fluid motor said fluid pump forming said override hydraulic fluid system, means for braking said fly wheel in response to deceleration of said motor vehicle when said vehicle brakes are applied, passage means connecting said hydraulic fluid brake actuating system in said override system, a hydraulic cylinder formed by said passage means, a free floating piston in said hydraulic cylinder biased to a position maintaining pressurization in said hydraulic fluid system when said vehicle brakes are actuated and said wheel is rotating normally.

2. An anti-skid device comprising in combination, a hydraulic fluid brake actuating system adapted for actuating a plurality of vehicle brakes, an anti-skid device including a vehicle wheel, a hydraulic fluid pump connected to said vehicle wheel, a fly wheel, a hydraulic fluid motor connected to said fly wheel, an override system comprising said fluid motor and said fluid pump, passage means connecting staid override system with said hydraulic fluid brake actuating system, a cylinder in said passage means, a piston operating within said cylinder, means for braking said fly wheel in response to deceleration of said motor vehicle, said piston operating in said cylinder providing a momentary loss of pressure in said hydraulic fluid system due to sudden decrease in rotation of said vehicle wheel to thereby permit decrease of fluid pressure in said hydraulic fluid brake actuating system during brake actuation to restore normal rotation of said vehicle wheel.

3. An anti-skid device comprising in combination, a hydraulic fluid brake actuating system, an override hydraulic fluid system including a hydraulic fluid pump driven by a vehicle wheel, a hydraulic fluid motor, a fly wheel connected to said hydraulic fluid motor, conduit means connecting said fluid motor with said fluid pump, passage means connecting said override system with said hydraulic brake fluid system, a cylinder formed in said passage means, a piston operating within said cylinder, a surface on said piston exposed to said hydraulic brake fluid actuating system, a second surface exposed to said override fluid system, means for braking said fly wheel in response to deceleration of said vehicle thereby providing pressurization of fluid in said override system to bias said piston to maintain a pressure in said hydraulic fluid system when said vehicle wheels are rotating normally.

4. An anti-skid device comprising in combination, a hydraulic fluid brake actuating system, an anti-skid device including a fluid pump, a vehicle wheel connected to said fluid pump, a fly wheel, a fluid motor connected to said fly wheel, a braking means for retarding rotation of said fly wheel, a weight connected to said braking means biasing said braking means for frictional engagement of said fly wheel in response to deceleration of said motor vehicle, conduit means connecting said fluid motor with said fluid pump forming an override hydraulic fluid circuit, passage means connecting said fluid override circuit with said hydraulic fluid brake actuating system, a hydraulic fluid cylinder formed in said passage means, isolating piston positioned in said cylinder, a first end surface on said piston exposed to the fluid pressure in said hydraulic fluid brake actuating system, a second surface on said piston exposed to pressurization of fluid in said override circuit, said braking means operating on said fly wheel causing pressurization of fluid between said fluid pump and said fluid motor for normal rotation of said vehicle wheel, and permitting said piston to move axially to relieve fluid pressure in said hydraulic fluid brake actuating system upon locking of said vehicle wheel when said vehicle brakes are actuated.

5. An anti-skid device comprising in combination, a hydraulic fluid brake actuating system, an anti-skid device including, a fluid pump, a vehicle wheel connected to said fluid pump, a fly wheel, a fluid motor connected to said fly wheel, a braking means for braking the rotation of said fly wheel, an inertia element connected to said braking means to actuate said braking means in response to deceleration of said motor vehicle, an override fluid system including a conduit means connecting said fluid motor with said pump, passage means connecting said conduit means with said hydraulic fluid brake actuating system, an isolator cylinder formed by said passage means, a floating piston in said cylinder, a chamber formed on either end of said cylinder by said piston, said braking means causing retardation of rotation of said fly wheel to create a pressure in said conduit means for biasing said piston in maintaining a hydraulic fluid pressure in said braking system when said vehicle wheel is in normal rotation, said vehicle wheel causing the pressure in said override system to decrease when said vehicle wheel is locked thereby decreasing hydraulic fluid pressure in said brake actuating system through movement of said piston to restore normal rotation of said vehicle wheel.

6. An anti-skid device comprising in combination, a hydraulic fluid brake actuating system adapted for actuating a plurality of vehicle brakes, an anti-skid device including a fluid pump, a vehicle wheel connecting said fluid pump, a motor, a fly wheel connected to said motor, an override hydraulic fluid system including conduit means connecting said fluid pump with said fluid motor, passage means forming a hydraulic cylinder and connecting said hydraulic fluid brake actuating system with said override hydraulic fluid system, a free floating piston in said cylinder to maintain a pressure in said hydraulic fluid system upon rotation of said vehicle wheel and momentary release of pressure in said hydraulic fluid brake actuating system when said vehicle wheel locks, a braking means connected to said motor to retard rotation of said fly wheel in response to deceleration of said vehicle wheel for building up a back pressure in said override system when said vehicle brakes are actuated.

No references cited.